US006834382B2

(12) United States Patent
Marso et al.

(10) Patent No.: US 6,834,382 B2
(45) Date of Patent: Dec. 21, 2004

(54) MESSAGE PARSER AND FORMATTER

(75) Inventors: Thomas Marso, Parker, CO (US); Russell Hawkins, Parker, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 608 days.

(21) Appl. No.: 09/895,815

(22) Filed: Jun. 29, 2001

(65) Prior Publication Data
US 2002/0078349 A1 Jun. 20, 2002

Related U.S. Application Data
(60) Provisional application No. 60/215,114, filed on Jun. 29, 2000.

(51) Int. Cl.[7] .............................................. G06F 9/45
(52) U.S. Cl. ....................................... 717/143
(58) Field of Search ........................................ 717/143

(56) References Cited

U.S. PATENT DOCUMENTS

2002/0073058 A1 * 6/2002 Kremer et al. .................. 707/1
2002/0083210 A1 * 6/2002 Harrison et al. ............ 709/310
2002/0141449 A1 * 10/2002 Johnson ....................... 370/473

OTHER PUBLICATIONS

Myliymaki, J., Effective Web Data Extraction with Standard XML Technologies, May 1, 2001, ACM, p. 689–696.*

* cited by examiner

Primary Examiner—John Chavis
(74) Attorney, Agent, or Firm—Marsh Fischmann & Breyfogle LLP

(57) ABSTRACT

The present invention relates to a utility for transforming messages from an external form to the internal representation of a given application and vice versa. The utility can handle messages relative to a variety of external systems and a variety of different formats without recompiling. In one embodiment, the invention is implemented in connection with a classified information processing and distribution system (100). Multiple input sources (102) provide information to the system (100) at various levels of classification and this information is reported over various communication channels (106, 108 and 110) and in different message formats. The system (100) sanitizes that data to the classification levels required for dissemination over lower level channels (112 and 114) to addressees (104), at least some of whom do not have clearance sufficient to receive all of the input information. A MAG module (118) transforms input data from the various external formats into the internal data representation of an ADS module. The MAG module (118) further receives sanitized information from the ADS module in the internal representation and transforms such information into the various external formats of the addressee systems. The module (118) is a table driven subsystem that can access multiple external format specifications stored in a table structure so as to implement the noted transformations.

19 Claims, 12 Drawing Sheets

MAG
DATA TRANSFORMATION - A CHARACTER MESSAGE

MAG
DATA TRANSFORMATION - A BINARY MESSAGE

MAG
A TABLE-DRIVEN UTILITY

MESSAGE PARSER AND FORMATTER

CROSS REFERENCE TO RELATED APPLICATION

This application is a continuation-in-part of U.S. Provisional Patent Application No. 60/215,114, filed on Jun. 29, 2000, ("Parent Application") which is incorporated herein by reference.

FIELD OF THE INVENTION

The present invention relates in general to utilities for transforming messages from an external form to an internal representation for use in a given application/computing environment and vice versa. More particularly, the present invention relates to such a utility that can handle messages relative to a variety of external systems or variety of different formats without recompiling and that provides significant flexibility in message parsing/processing.

BACKGROUND OF THE INVENTION

Many software applications require transformation of data from the form in which data is received by the application to a form upon which the application can act. Likewise, an application's internal representation of data must often be transformed to an external representation that the application's users (human or machine/software) can understand. Such transformation may address a variety of issues including, for example, different data formats, different syntax and different messaging protocols.

In order to address such issues, it is typically necessary to parse an incoming message into elements or "tokens" that the application can properly process. The size of these tokens or parsing resolution depends, inter alia, on the nature of the subject matter involved and the desired functions of the application.

Consider first the context of text based messages. If the application is formatting a long document, it may need to process large chunks of content corresponding to paragraphs, chapter headings, section headings and the like. By contrast, an application screening messages for security purposes may need to review individual words and authorization codes. By way of further example, an application for routing messages to particular network nodes may require access to particular header fields or other address information but may be otherwise uninterested in the message content.

Next consider the context of data based messages or mixed text and data. For example, one application may be designed for accessing business records in a company database based on various fields identifying customers, products, product codes, pricing, etc. Another application may be involved in distributing strategical information relating to the locations and movements of identified military assets. In each such case, a utility may be required to identify and separate for internal handling particular fields of data whose size, in terms of data bits or text characters, can vary depending, for example, on the source and format of the incoming message.

A variety of parsing utilities exists. Often, these utilities are pre-configured for use in a particular computing environment, e.g., for handling a particular type of messages. For example, a utility for handling XML messages may parse messages based on tags included in the messages which can be managed based on a Document Type Definition. Other utilities may be configurable to handle different types of messages. Generally, such utilities are configured at compile time for a particular application. In many cases, these utilities parse messages in a single pass based on predefined rules applicable to the whole message.

Such utilities have certain limitations related to operation in a multi-system environment, i.e., an environment where messages are received from multiple sources and/or are transmitted to multiple destinations. In particular, utilities that are pre-configured to operate in a particular environment may be unable to properly handle all messages in a multi-system environment. Configurable utilities may be able to handle a variety of messages, but may require re-compiling, and sometimes re-certification to handle multiple message types. As a result, configurable utilities may entail unacceptable message transfer latency for some applications. Single-pass utilities as noted above may also be constrained by their parsing rules to provide a particular parsing resolution which may not fully meet the needs of a multi-system environment.

SUMMARY OF THE INVENTION

The present invention is directed to a utility for parsing and formatting that has improved processing flexibility. The utility can be reconfigured on-the-fly, i.e., after compile-time or during run-time, to handle different types of messages. It can also parse incoming messages recursively to provide a desired or selectable level of parsing resolution. The invention thus has certain processing advantages for a variety of environments including multi-system environments.

According to one aspect of the present invention, a method and corresponding apparatus (collectively, "utility") are provided for transforming a message between a first internal form associated with a first internal system (such as an application embodied in software, hardware and/or firmware) and a second external form, different than the first internal form, associated with a second external system. The utility may receive the message in the second external form of the second external system and transform it to the first internal form for use by the first internal system or vice versa. The methodology involves establishing a generic processing engine for performing a transformation process relative to an information stream associated with the second external system and operating the processing engine to receive the message in one of the first and second forms. The generic processing engine is adaptable to handle messages in multiple (two or more) forms associated with multiple external systems. The method further involves operating the processing engine to access storage including specification information for multiple external systems including the second external system, configuring the generic processing engine based on external specification information regarding the second external system, and operating the configured processing engine to transform the message between the first internal form and the second external form. In this manner, the utility is operative for efficiently transforming messages in a multi-system environment.

In order to facilitate such multi-system operation, the step of configuring can be implemented after compile time or during run time. The associated process involves compiling the generic processing engine and then operating the compiled engine to access the external specification information. In this regard, the processing engine may be table-driven such that specifications for various external systems are stored in separate tables of a database, e.g., a relational database. Each such table may store a list of parameters defining an external format indexed to an identifier for that format. Then, upon receiving a message or otherwise being prompted, the engine can identify the external system, access the associated specification and use the parameters for configuration. Many different message formats may be supported in this regard, including text and image formats. The engine can thus convert an external message to an internal form and/or internal messages to the external form. By virtue of this architecture, the engine can handle messages in multiple formats without recompiling or re-certification.

In accordance with another aspect of the present invention, a utility is operative for recursively parsing an input to provide a desired or selectable level of parsing resolution. The associated methodology involves: establishing a module for processing an information stream, the module including a parsing engine and a processing engine; first operating the parsing engine to select a portion from said data stream (e.g., the full text of a message or a portion thereof) and define said portion as a parent object; second operating the parsing engine to parse the parent object into multiple child objects, where each child object has a child content that is a subset of a parent content of the parent; third operating the processing engine to perform a predefined process (e.g., performing a security "dirty word" screening process) on at least one of the child objects; redefining at least a second one of the child objects (the same as or different from the first one) as a parent object; and repeating the steps of second operating and third operating with respect to the redefined object.

The utility is thus operative for recursively processing the input information stream to provide a desired or selectable level of processing resolution. In this regard, the process of redefining a child object as a parent object and repeating the noted steps with respect to the redefined object may be conducted iteratively until sufficient parsing is achieved. Different portions of the input, e.g., a message, may be parsed to different resolutions if desired for a particular application. Similarly, sibling objects may undergo a different number of iterations to achieve a common parsing resolution. For example, a parsing process may be conducted on a text based document. The desired resolution for the process may be word-by-word parsing. An initial step of the process may parse the document into a number of headings and a corresponding number of sections. Each such initially parsed token, referred to below as a "Mag", is a sibling object. The headings may be directly parsed into words whereas the text sections may require further recursive parsing into paragraphs, sentences and the like. Thus, the parsing process, by virtue of its recursive functionality, is highly adaptive to various applications and types of content.

In accordance with a further aspect of the present invention, a utility is operative for transliterating a message from one input format to multiple output formats. As used herein, "transliterate" refers to a process by which a message is transformed from one format to another on an object-by-object basis, where each object has a content suitable for transformation. The associated process involves accessing a message reflecting a first input format; making at least one copy of the message; accessing a first external format specification relating to a first one of the multiple output formats; configuring a processing engine based on the first external format specification; first operating the configured processing engine to access a first instance of the message (the original or a copy) and transform the message based on the first specification to provide a first transformed message; accessing a second external format specification relating to a second one of the multiple output formats; configuring the processing engine based on the second external format specification; second operating the configured processing engine to access a second instance of the message (the original or a copy) and transform the message based on the second specification to provide a second transformed message; and transmitting the first and second transformed messages.

The utility has particular advantages with respect to certain multi-system applications. For example, the utility may be useful in connection with distribution modules for distributing internal messages to multiple end users. Relatedly, this process may be implemented in connection with a centralized processing module for receiving input from any of multiple sources and distributing output to many of multiple end users or other target systems. The invention thus greatly facilitates certain processes within multi-system environments.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

The present invention is directed to a message parsing and formatting utility. The invention is applicable in a variety of contexts where it is desirable to transform information from an external format to an internal representation for use by an application or vice versa. Moreover, the invention may be implemented in conjunction with a variety of different applications. In the following description, the invention is set forth in the context of a sanitization system for controlling dissemination of classified information. This context serves to illustrate the various functions and advantages of the present invention, but it should be appreciated that the invention is not limited to this context.

A. Overview

Figure 1:
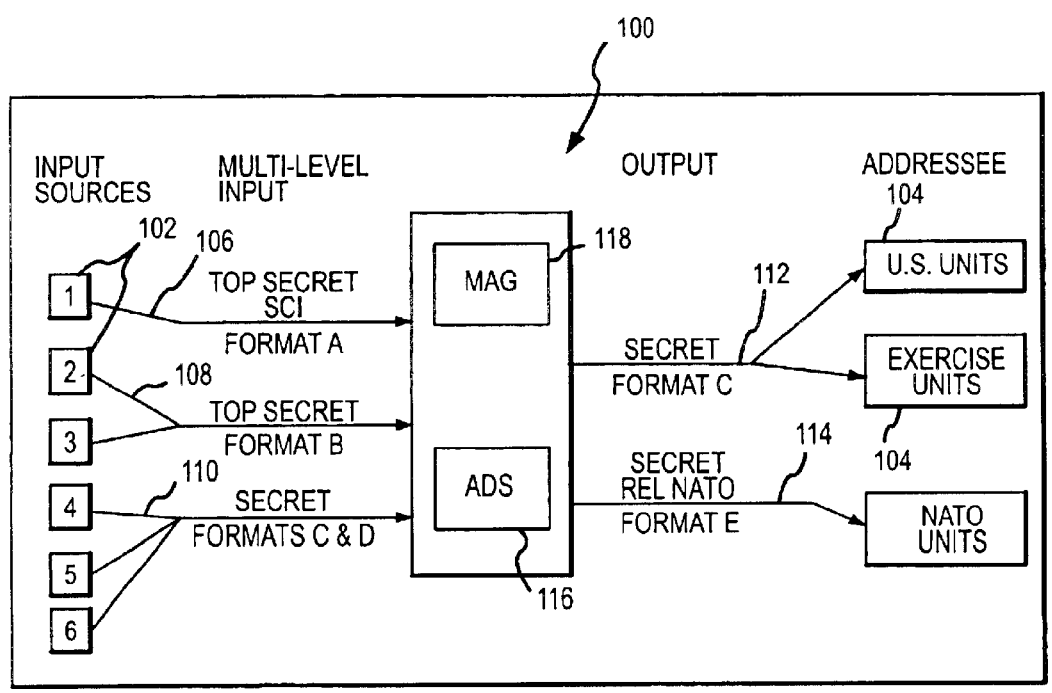
FIG. 1 is a schematic diagram of a classified information processing and distribution system in accordance with the present invention.

FIG. 1 is a schematic diagram providing an overview of a classified information processing and distribution system 100 in accordance with the present invention. As shown, multiple input sources 102 provide information to the system 100 at various levels of classification. In the illustrated example, these classifications include "secret" and "top secret", as well as sensitive compartmented information (SCI). This information is reported over various communication channels 106, 108 and 110 and in different message formats, in this case designated formats A–D. The system 100 sanitizes that data to the classification levels required for dissemination over lower level channels 112 and 114 to addressees 104, at least some of whom do not have clearance sufficient to receive all of the input information, i.e., addressees who are only authorized to see sanitized versions of the data. In the illustrated case, the output channels 112 and 114 are associated with classification levels "Secret" and "Secret Rel NATO." The system 100 accommodates different addressee consumers by reporting data in formats they understand or can process, which may or may not be the same as the original reported format. In the illustrated embodiment, the output channels 112 and 114 are shown as handling data in formats C and E, i.e., one of which (C) overlaps the input formats and one of which (E) does not.

The system 100 implements supplements or replaces conventional manual sanitizer terminals and provides a standard intelligence data communications interface. The system 100 implements sufficiently trusted software and hardware within a system concept that removes the human interaction required by manual sanitization. This accelerates delivery of time sensitive information, since human intervention is not required for each message release. It also increases the level of trust, since a computer can be relied upon to perform repeatedly the same tasks in exactly the same way, unaffected by the type of performance distractions to which a human operator may be subject.

Application of the "need-to-know" doctrine within the compartmented security system of the United States means that various users are to receive only selected subsets of the information and products produced by the intelligence community. Gatherers of this intelligence information and creators of the intelligence product initially are responsible for determining the security level of their output. Systems which subsequently distribute and further process this information, including the illustrated system 100, are responsible for insuring that the integrity of the security classifications are maintained.

The classification of a message such as an individual contact report is defined by the sensitivity of the information in the data fields within the report format. It is possible to modify (e.g., change or delete) the information in specific fields within the contact report to reduce the overall classification of the message information and so give the message a broader releaseability. In the past, this action required determination by an operator/analyst to insure that product dissemination did not compromise higher-level accesses or compartments. This added processing delay time to contact data which is often time-critical to the final tactical user, e.g., the Command and Control tactical decision-maker or the Over-the-Horizon weapon system.

In some cases, the nature of the data and message formats used for data distribution permit the system 100 to insure that sanitization, downgrading or screening is properly accomplished quickly. This is especially true in the following cases: where message formats are well-defined and controlled and contain free text fields; where these free text fields may be simply eliminated from the resultant outgoing product; and where the rules governing information classification and the formatted data fields are well defined and understood.

The illustrated system 100 generally includes an Automatic Data Sanitizer (ADS) module 116 and a Message Analysis and Generation (MAG) module 110. The ADS module 116 provides the automated means by which formatted multi-level classified data, including SCI, is sanitized and rapidly disseminated at different classification levels. The module 116 in cooperation with the MAG module 118 accepts classified data from designated communications channels, sanitizes and then reclassifies the data according to user-designated rules, and verifies that the data meets a set of precisely defined and rigorously controlled criteria for release. The ADS module 116 releases the information at a different level of classification or compartmentation, typically at the general service (GENSER) level. The system 100 disseminates the information only to users cleared for that level of classification and/or compartmentation. It does not disclose or release data to unauthorized consumers.

The MAG module 118 addresses issues relating to accommodating different data formats. As noted above, the various external systems that define the input sources and output addressees/consumers of classified information are characterized by a proliferation of data transmission formats. The MAG module 118 generally performs two transformation functions in this regard. First, the module 118 transforms input data from the various external formats into the internal data representation of the ADS module 116. Then, the MAG module 118 receives sanitized information from the ADS module in the internal representation and transforms such information into the various external formats of the addressee systems. It will thus be appreciated that the MAG module 118 is capable of handling a variety of external formats. As will be described in more detail below, the MAG module 118 is a table driven subsystem that can access multiple external format specifications stored in a table structure so as to implement these transformation functions without undue delay.

The following description is generally divided into two sections. First, the various interface functions as implemented by the MAG module 118 are described. These functions include the parsing of input data and formatting of output data. Next, the following description includes a detailed discussion of the various sanitization related functions implemented by the ADS module 116.

B. The Mag Module

FIGS. 2–8 illustrate the various structures and processes of the MAG module. Although the MAG module is described for use in connection with the sanitization and distribution of classified information and has particular advantages in this regard, it will be appreciated that various aspects of the MAG module are useful in other contexts in connection with other applications. In this regard, many applications need to parse and format message data. These functions are generally transformations between external and internal (application-specific) representations of information. The MAG module provides a simply invoked and powerful utility for both transformations.

Figure 2:
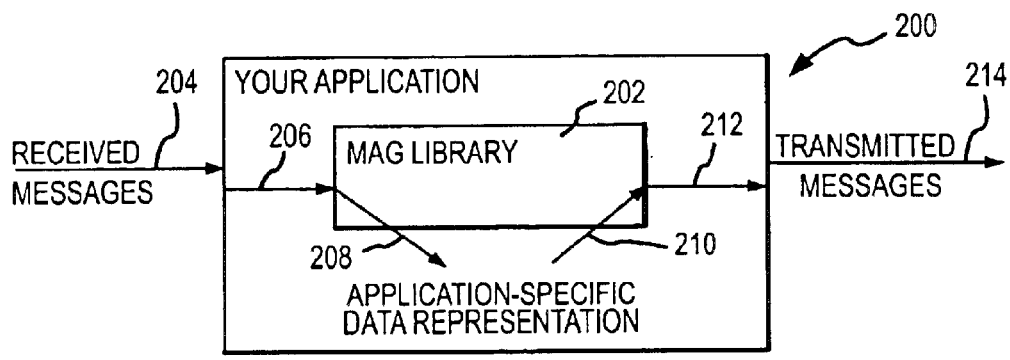
FIG. 2 is a schematic diagram showing an information flow relative to a MAG module in accordance with the present invention.

FIG. 2 provides a schematic diagram of the MAG module functionality. In the illustrated example, the MAG module 202 is incorporated into and may be called by a processing system 200 such as the classified information processing and distribution system of FIG. 1. The system 200 receives messages 204 in any of multiple external formats. The module 202 receives an input 206 based on the received message 204 and processes the input 206 to provide a transformed input 208 reflecting an application-specific data representation. The processed input 208 is then further processed by the system 200 to generate an output 210, again reflecting an application-specific data representation. This output 210 is then processed by the MAG module 202 to generate a processed output 212 reflecting an external format of an identified addressee system. The system 200 then provides e.g., transmits or otherwise makes available for transmission an output message 214 based on the processed output 212.

As will be discussed in more detail below, the MAG module 202 is recursively invoked and is driven by format specifications. Such recursive invocation enables the module 202 to provide a selectable parsing resolution to address specific parsing processes. In this regard, the utility can parse entire messages, data sets within a message, data items within a data set and sub-items within a data item. The data can thus be analyzed in a tailored fashion as precisely as the calling application requires. The module 202 can thereby implement single instances of various message processing functions (e.g., extraction, content validation, checks and validation) at each such level of a message. All of this functionality is based on a platform and application independent library enabling reuse of the MAG module 202 in a variety of computing environments. Moreover, the common form of the internal representation of data used by the module 202 simplifies message translation.

Figure 3:
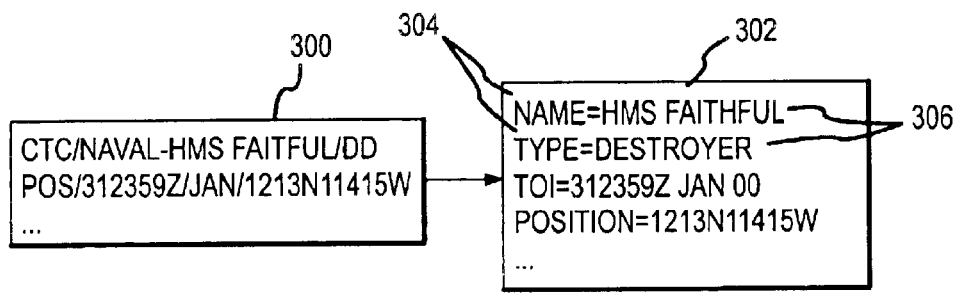
FIG. 3 illustrates an input data transformation in accordance with the present invention.
Figure 4:
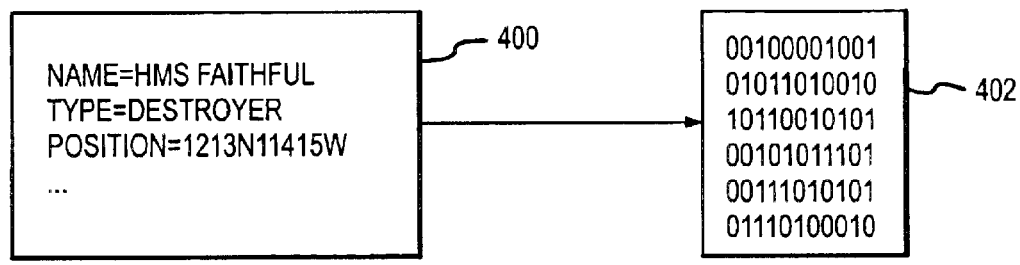
FIG. 4 illustrates an output data transformation in accordance with the present invention.

As noted above, the illustrated Mag functions entail two separate data transformations. The module 202 can handle various messaging formats including character-oriented (ASCII) and bit-oriented (binary) messages. The transformation processes that are possible are as varied as the permutations of different source and addressee formats. FIGS. 3 and 4 schematically illustrate character and binary message transformations respectively. Specifically, these Figs. illustrate an exemplary information flow through a sanitization system incorporating the MAG module 202 where input text is received in a character based input format and sanitized data is output in bit based format.

Referring first to FIG. 3, box 300 illustrates a formatted character-based message input. The input 300 includes a number of data fields from which useful data can be extracted. The process for extracting such data involves accessing a format specification, using the format specification to parse the message into its various fields and reading the information from the various fields. Box 302 illustrates an internal data representation that can be understood by the calling application. In this case, the internal representation 302 includes a number of tags 304 identifying the data fields together with content 306 associated with each such tag. FIG. 3 thus illustrates an input transformation process from an external format to an internal data representation.

FIG. 4 illustrates an output transformation. Box 400 represents an internal data representation. The content of this message may be the same or different than the input message. In the illustrated example, the message 400 is a sanitized message (at least the Time of Intercept—TOI—field has been eliminated from the input message as shown in FIG. 3). In the illustrated example, the message 400 is transformed to a binary message output 402. The binary message 402 includes all of the data for message 400 organized in a format that will be understood by an identified addressee system. Again, this transformation is performed based on a format specification defining the corresponding external format.

Figure 5:
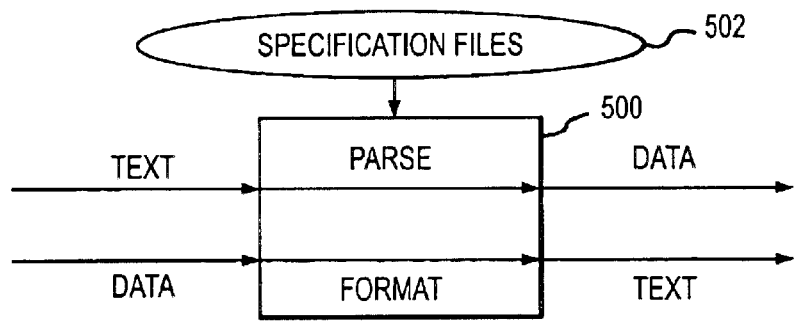
FIG. 5 illustrates a high-level architecture of the MAG module of FIG. 2.

The MAG module thus provides a message disassembly and reassembly engine. A preferred architecture for such a module 500 is generally illustrated in FIG. 5. As shown, the module 500 is configurable for different transformation processes by accessing stored specification files 502. The specification files 502 may be stored in format specific tables, e.g., in a relational database where each table includes a format specification and an identifier or link for that format. Details of the various formats thus reside outside of the executable software of the module 500 and outside of the calling application. When the module 500 is required to process a new message format (input or output format) software modifications are generally not required. Rather, a new format specification can simply be added to the specifications files 502. Similarly, when an existing message format changes or a source system breaks predefined rules, it is generally unnecessary to rewrite software. Such issues can generally be addressed by modifying a file of the specification files 502.

The formats and associated specifications may be standard or custom formats. Examples of formats that may be supported by the module 500 include OTHT—Gold, OILSTOCK, KLIEGLIGHT, TACELINT, TACREP, TIBS binary, ENSCORE—ELD, NITF, SENSOREP, SAR, TRE Tabular, various inter-database formats and numerous specialized formats. The module 500 can process and transliterate on a line-by-line or similar basis relative to such formats. Simple user interfaces may be provided for selecting and defining formats to be supported for a particular application as set forth in the Parent Application.

The specifications are thus external to the compiled software. As a result, it is unnecessary to recompile software each time processing formats change. The specifications are also generally hierarchal. That is, the specifications may be defined relative to an overall message, a data group, a data item, and data sub-items. Accordingly, as will be discussed below, the module 500 can implement a substantially unlimited depth of resolution and text analysis. Moreover, many of the attributes of the specifications are inheritable. That is, many specifications evolve from a common lineage. For example, two specifications may have evolved from a common parent. In such cases, many of the specifications' attributes can be inherited from the parent thus simplifying specification definition and reducing the required storage space. Similarly, many of the attributes of the various specifications are reusable. For example, it is generally unnecessary to respecify the known months of the year each time a message references one.

The basic paradigm of a system implementing the MAG module is a parse-process-reassemble paradigm. An example of the intermediate process step is set forth in the latter section of this description. The associated concepts of parsing, parsing resolution, inheritance and the like may be better understood by reference to the parse tree 600 of FIG. 6. For the purposes of this example, consider the components that constitute a simple document 602. In this case, the document 602 is composed of sections of text separated by section markings. The defined sections might include introduction 604, scope, 606, references 608, descriptive 610 and recommendation 612 sections. Each descriptive section 610 may be further divided into an introductory paragraph 614, a series of section body paragraphs 616 and a summary paragraph 618, each separated by a blank line. Each paragraph may be divided into sentences 620 separated by periods, question marks, or exclamation points. Each sentence may further be divided into words 622 separated by blanks. The parsing functionality of the MAG module is recursive. That is, the module can iteratively access and parse the "tokens" that constitute the content of various levels of the parse tree 600. The specifications describing these various tokens are to referred herein as "Mags." Thus, in the illustrated example, the specification describing the document is the top level Mag. The introduction, scope, references, descriptive and recommendation section Mags are all children of the document Mag, and each is a sibling Mag to one another. Similarly, each descriptive section Mag is a parent to (or composed of) an introductory paragraph Mag, a repeatable body paragraph Mag, and a summary paragraph Mag. The hierarchy of parent and child continues to the lowest level of individual words in a sentence in this example. Thus, the MAG module can be recursively invoked to provide substantially any level of processing resolution. For example, a message may be parsed to the word level to search for "dirty words". In such a context, a sanitization process can be tailored to carefully protect against dissemination of protected information while enabling maximal transmission of clean information.

Figure 6:
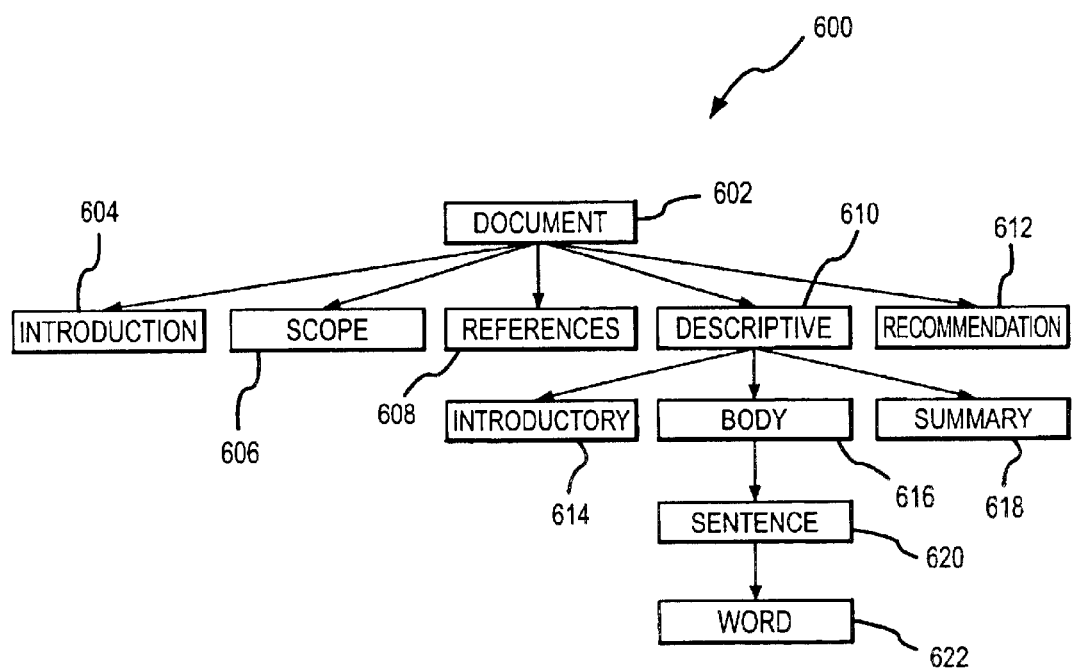
FIG. 6 illustrates a parse tree that may be executed by the MAG module of FIG. 2.

Also, from the parse tree of FIG. 6, it will be observed that many of Mags' attributes can be inherited from related Mags, thereby simplifying Mag definition and the required storage. The associated Mag specification tree, including all specifications of alternatives, components, delimiters, and so on, provides the roadmap needed to traverse the textual message. As the text of the message is sequentially parsed, available branches of the specification tree are followed or rejected to allow full understanding of message content. The text pertinent to an accepted branch is isolated and provided to higher resolution (component) specifications: a line of text is isolated and extracted based on its delimiters and lengths, and is then handed down to component field specifications which perform similar functions, isolating and extracting text for processing by component sub-field specifications.

The specifications define various Mag parameters. A Mag parameter is a variable aspect of the Mag definition that controls some part of Mag behavior. Most parameters of a Mag specification need not be defined; typically, this means that the validation or construction associated with that parameter specification will not be performed. Parameters may also be inherited from a parent Mag, so that child Mags need not repeat the specification of parameters of the parent. For each parameter, the requirements may be grouped by applicability to specification parse and format.

A detailed listing of parameter types is provided in the Parent Application as well as user interface implementations related thereto. Some of these parameters are: identification parameters that allow for identification of a Mag including specification of component or parent relationships and inheritability of parameters and specification of Mg type such as format-type (e.g., TACELINT) or field-type (e.g., ORIGINATOR); delimiting and length parameters that provide the means by which the content or text domain associated with a Mag is distinguished or isolated from the text that surrounds it including definition of delimiter symbols, maximum length and minimum length; content restriction parameters such as verification of allowed characters and detection of non-data indicators; and component parameters by which each Mag can specify a list of components that must be parsed in conjunction with the process by which the higher level Mag is itself parsed. This last parameter type will be better understood upon consideration of the following process flow discussion.

The processes implemented by the MAG module include parsing and formatting. In the context of the illustrated implementation of the present invention, parsing is the transformation of information from the input text domain to the internal data domain and formatting is the transformation of information from the internal data domain to the output text domain. While parsing is essentially a message-driven activity in which Mag specifications are chosen from those available based on how well they accommodate the message, formatting is a specification-driven activity in which text is generated based on the availability of internal data to populate it.

Figure 7:
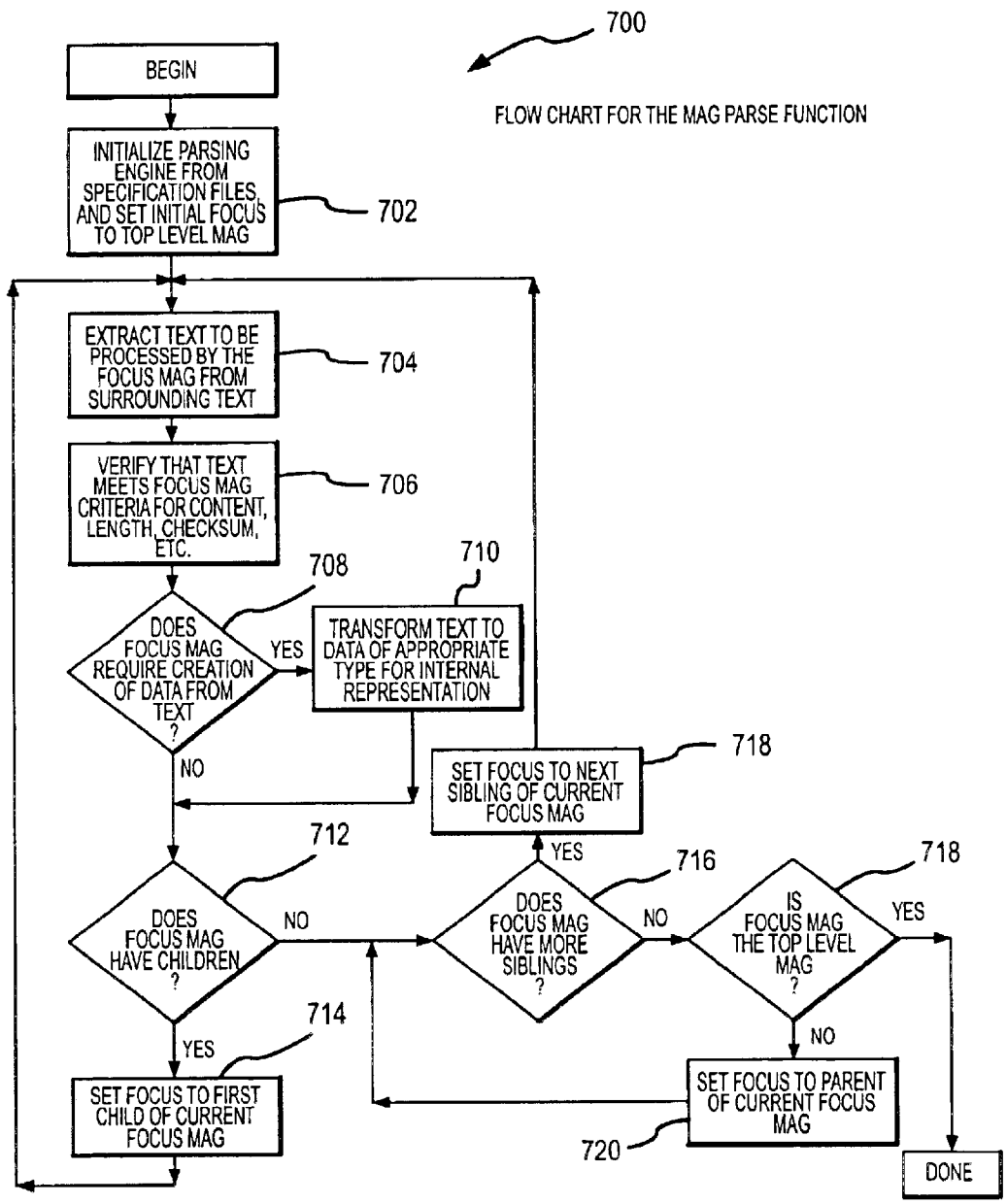
FIG. 7 is a flowchart of a Mag parse function in accordance with the present invention.

FIG. 7 is a flow chart illustrating the Mag parse function 700. The function 700 begins with initializing (702) the parsing engine component of the MAG module from specification files and setting the initial focus of the parsing engine to the top level Mag. This involves identifying the external format of the information source accessing the corresponding specification from the specification tables and using the specification to configure the parsing engine. The specification will also define the top level Mag. This Mag becomes the "focus" Mag for the ensuing processing. The MAG module then extracts (704) the text to be processed by the parsing engine using the focus Mag from the surrounding text. Specifically, a primary purpose of the parsing function 700 is to transform a message from an external format to an internal representation. This is implemented based on the specification for the external format. For each token of a parse tree, the associated text is processed based on its Mag.

Prior to transformation, the MAG module verifies (706) that the text meets focus Mag criteria for content, length, checksum, etc. It is then determined (708) whether the focus Mag requires creation of data from text. If so, the text if transformed (710) to data of an appropriate type for internal representation. If not, further parsing may be required. In this regard, the MAG module next determines (712) whether the focus Mag has any children. If so, the focus of the parsing engine is set (714) to a first child of the current focus Mag and the process defined by blocks 704, 706, 708 and 710 is repeated using the new focus Mag. It will thus be appreciated that loop 704, 706, 708, 710, 712 and 714 defines a process for recursively parsing along a particular lineage (the "intralineage parsing process") to achieve the parsing resolution required for an application under consideration. If it is determined during any such iteration at block 712 that the focus Mag does not have children, then the MAG module determines (716) whether the focus Mag has any siblings. If so, the focus of the parsing engine is set (718) to the next sibling of the current focus Mag and the intralineage parsing process is repeated with respect to this sibling. In this manner, different lineage branches of the parse tree can be parsed to the resolution required for a particular application.

If it is determined at block 716 that the current focus Mag has no more siblings, then the MAG module determines (720) whether the focus Mag is the top level Mag. If not, the MAG module sets (722) its focus to the parent of the current focus Mag to see whether the parent has any siblings. The loop thus defined can be iterated to work back up through the parse tree to the top level Mag. In this manner, any Mag relationships that may have been missed working downward through the tree can be identified. Once the top Mag is reached, the process is complete.

Figure 8:
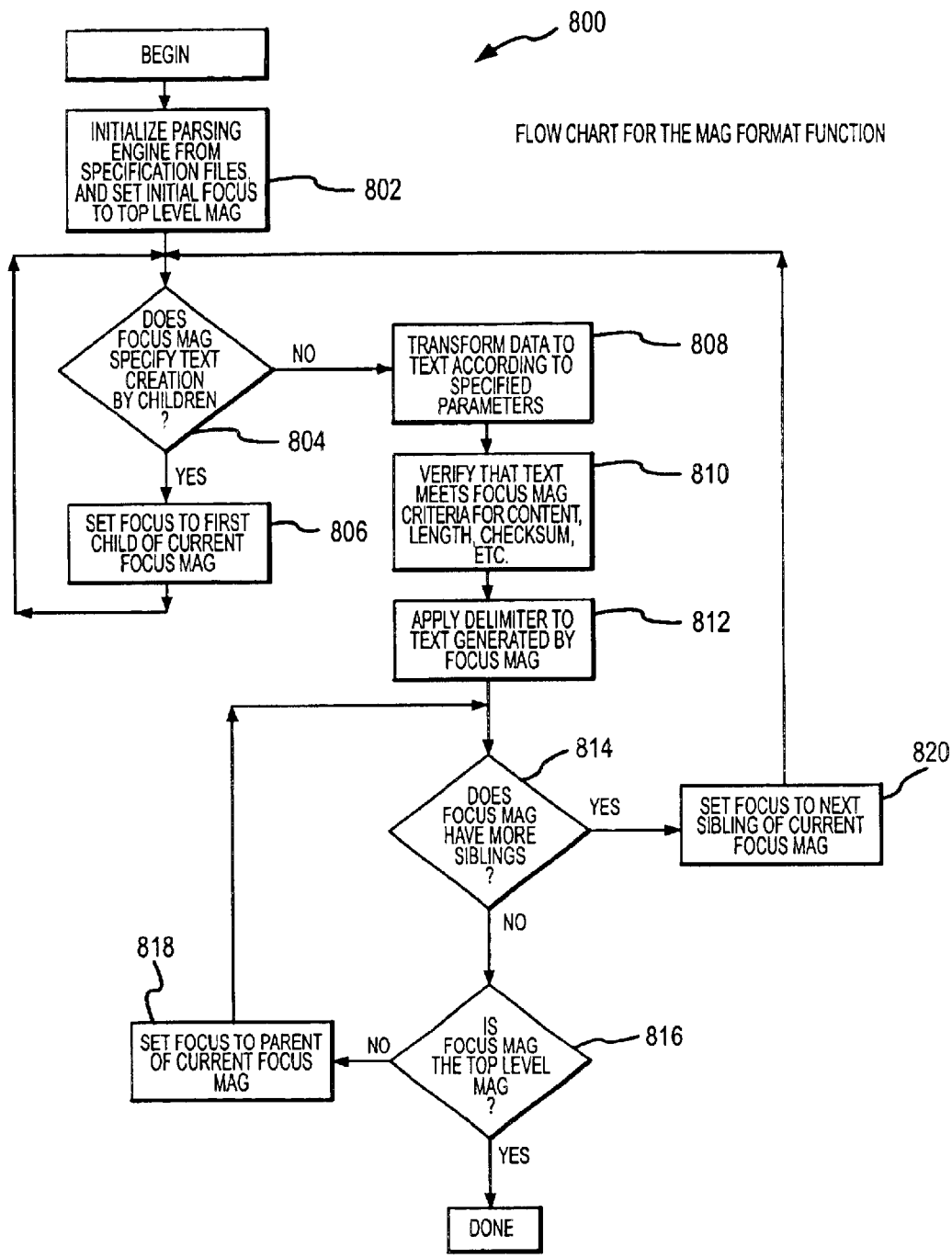
FIG. 8 is a flowchart of a Mag format function in accordance with the present invention.

FIG. 8 shows a flow chart for the Mag format function 800. The process begins by initializing (802) the parsing engine from the specification files and setting the initial focus of the engine to the top level Mag. Similar to the process described above, this involves identifying a format of an external addressee system and accessing the corresponding specification table to configure the parsing engine. In order to transform a message from an internal application specific representation (e.g., in a data format) to an external addressee format, it is necessary to parse the message to the parsing resolution required for transformation to the target format. Thus, the MAG module next determines (804) whether the focus Mag specifies text creation by children of the current focus Mag. If so, then the focus is set (806) to the first child of the current focus Mag. The loop defined by blocks 804 and 806 is then iterated until the MAG module determines at block 804 that the focus Mag does not specify text creation by children. At this point, the required processing resolution has been achieved with respect to the focus Mag. In this case, the MAG module transforms (808) the content associated with the focus Mag from the internal representation (e.g., data) to the target format (e.g., text) according to the parameter specified by the focus Mag. The resulting text is then analyzed to verify (810) that it meets focus Mag criteria for content, length, checksum, etc., and any appropriate delimiters are applied (812) to the resulting text.

Next, the MAG module determines (814) whether the focus Mag has any siblings. If so, the focus is set (820) to the next sibling of the current focus Mag and the preceding parsing and transformation steps are repeated. If the focus Mag does not have siblings, the MAG module determines (816) whether the focus Mag is the top level Mag. If not, the focus is set (818) to the parent of the current focus Mag and the resulting loop is iterated to work back up through the parse tree and identify any Mag relationships that may have been missed working downward. When it is determined at block 816 that the focus Mag is the top level Mag, then the process is complete.

In the context of the system 100 of FIG. 1, the MAG module 118 as described above is operative to interface the ADS module 116 with the various source systems and addressees. The operation of the ADS module 116 will now be described.

C. Ads Module

Figure 9:
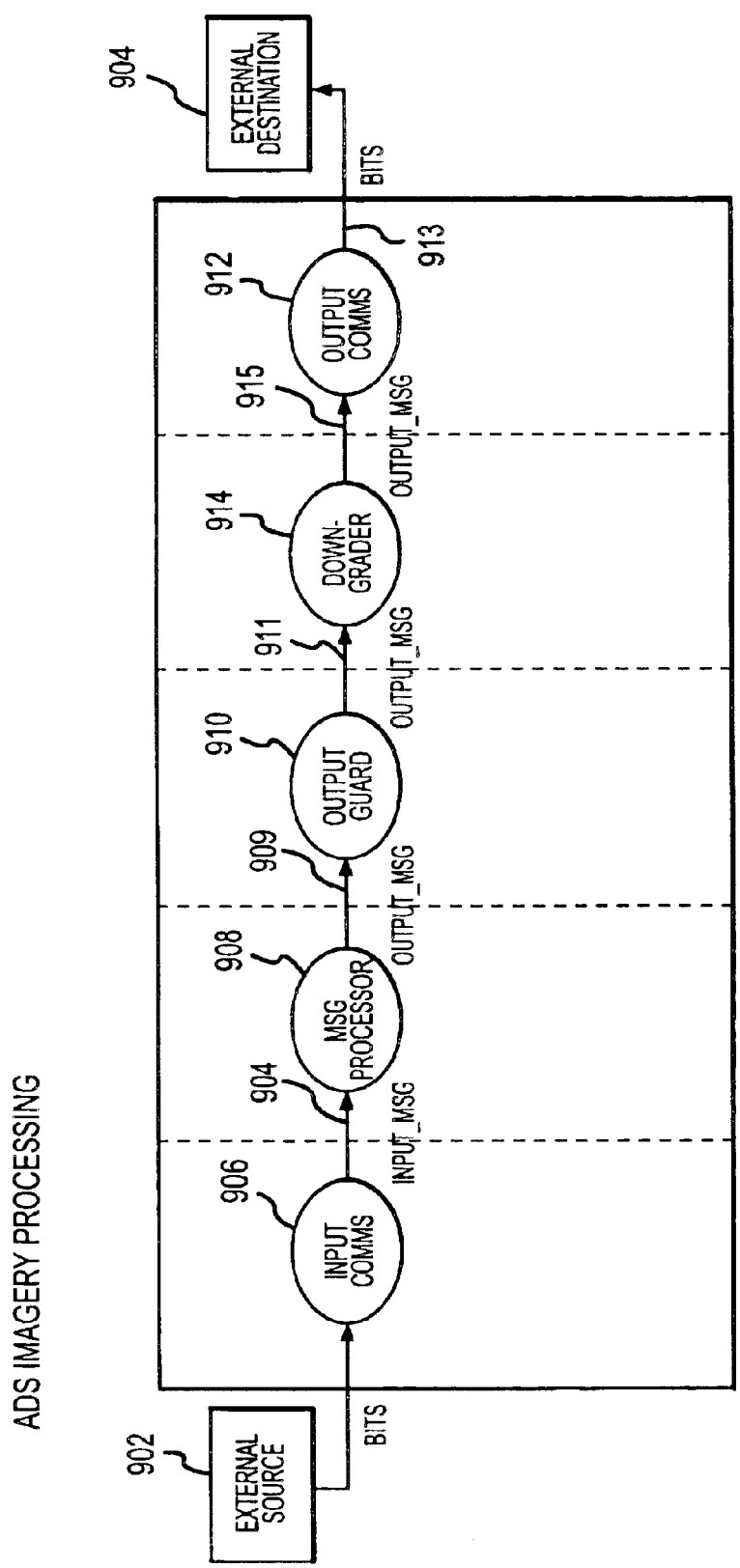
FIG. 9 is a schematic diagram of an ADS module in accordance with the present invention.

FIG. 9 is a schematic diagram of the ADS module 900. The module 900 automatically modifies, or sanitizes, formatted data from an external source system 902, according to sanitization rules, for release to an external destination system 904 so that the destination system receives only that portion of the original data for which it is authorized access. The module 900 generally includes an Input Comms Module 906, a Message Processor 908, an Output Guard 910, and a Downgrader 914 and Output Comms 912. The Input Module 906 supports the communications protocol dictated by the external source system 902 and forms a complete message from the message segments provided to it by the external system 902. The resulting complete input message 907 is then provided to the Processor 908 which sanitizes the message according to rules written for the specific external system 904 under consideration. The sanitized message 909 is then passed to the Guard 910 which verifies that the modifications performed by the Processor 908 are correct. The Guard 910 then passes the verified message 911 to the Downgrader 914 that in turn passes an output message 915 to the output directory of the Output Module 912, which supports the communications protocol dictated by the external destination system 904 so as to effect communication of an output message 913 from the ADS module 900.

Figure 10:
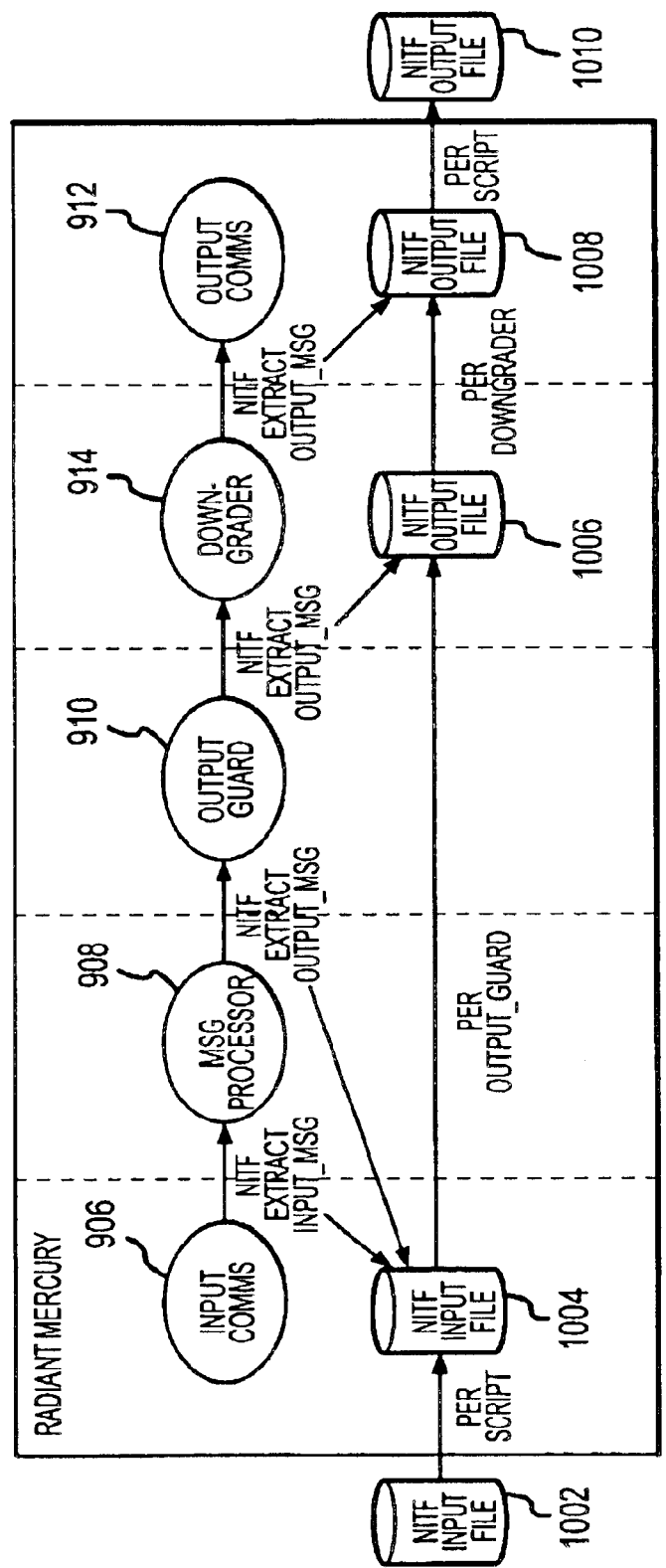
FIG. 10 is a schematic diagram of an alternative implementation of an ADS module in accordance with the present invention.
Figure 11:
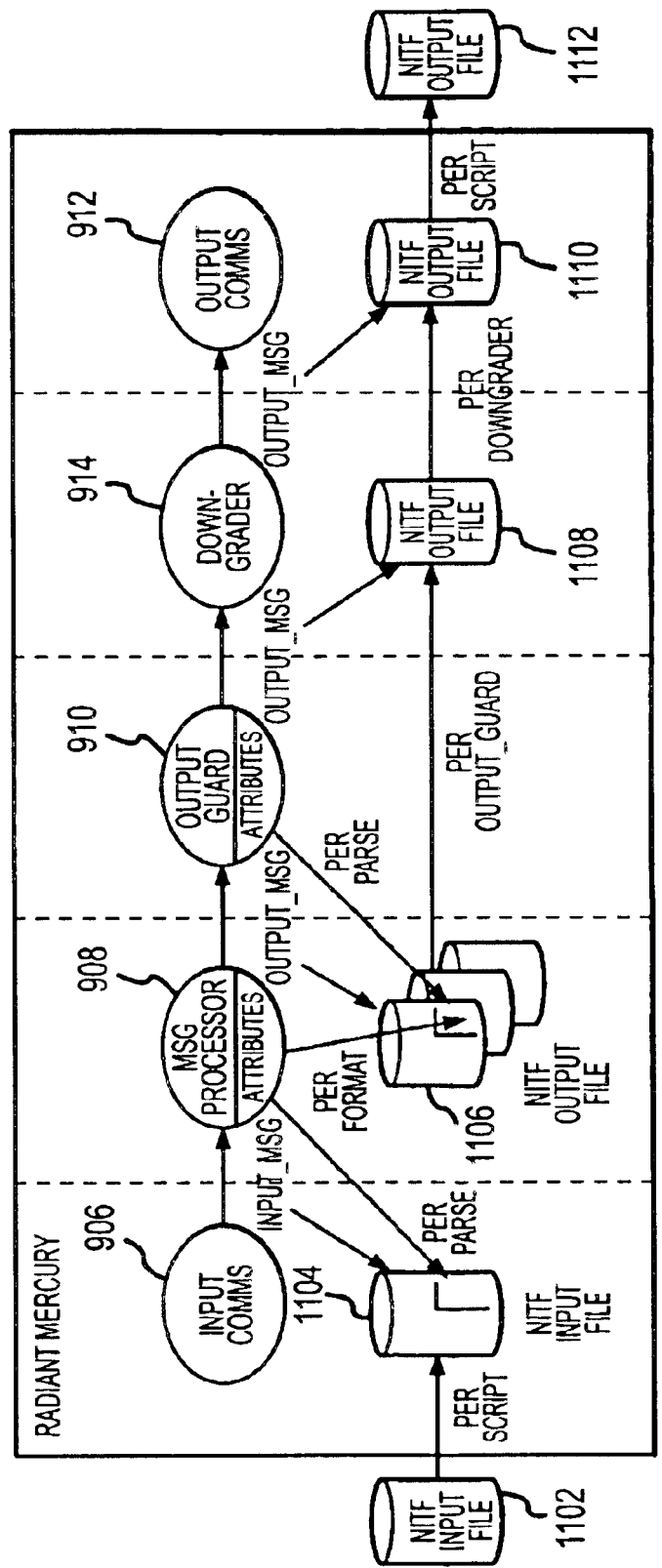
FIG. 11 is a schematic diagram of a further alternative implementation of an ADS module in accordance with the present invention.

FIGS. 10 and 11 show certain modifications of the ADS module for handling messages including images. The components of the modules illustrated in FIGS. 10 and 11 that correspond to components of FIG. 9 are identified by the same numerals. In a variety of applications, including dissemination of tactical information, it is desirable to be able to sanitize and distribute messages including images. However, the processing of such image messages presents certain challenges. First, image messages include image elements that are not readily susceptible to analysis using conventional sanitization rules. In addition, when text and other data components are included together with images, there is a need to separate the intelligible data from the image components. Image messages also often constitute very large files, e.g., sometimes in excess of two gigabytes. Currently, many tactical systems do not have this much RAM. Accordingly, the module structures of FIGS. 10 and 11 include certain modifications to address the needs of handling image messages.

Referring first to FIG. 10, the sanitization module 1000 is illustrated in an exemplary application for processing an image message in one standard image messaging format; namely, NITF. A goal of the module 1000 is to process NITF messages as much as possible like simple textual messages. The principal modifications relate to file management. In this regard, the message text is kept in an external file. Thus, the input file 1002 is initially stored in an input file database directory 1004. Upon completion of processing by the Message Processor 908 and Output Guard 910 as discussed below, the file is transferred to the Downgrader working directory 1006. The message as prepared for transmission by the Downgrader 914 is finally stored in transmission output file directory 1008 from which the output message file 1010 is made available to addressee systems. It will thus be observed that the large message file including its inscrutable image components is never loaded into running memory. Rather, the message is separated into its inscrutable image components and its intelligible data components and the processing capabilities of the Processor 908, Guard 910 and Downgrader 914 are allowed to operate only on the intelligible data components that are generally of a manageable size.

Accordingly, an initial parsing or processing rule is added to the various parsing and processing rules used for handling data. This initial rule identifies and deletes from the working files to be processed by the Processor 908, Guard 910 and Downgrader 914 certain inscrutable components. For example, such components may be identified based on size. In this regard, an attribute size threshold may be established that is sufficiently large to allow for processing of all text and other data, but sufficiently small to avoid loading image data into running memory. Such a rule is easily executed and the data components that remain for processing can then be processed using sanitization rules as discussed above.

More specifically, with regard to the input file 1002, a script can be used to access the NITF file from an external upstream system and write the NITF file into the Input Comms working directory 1004. The Input Comms 906 is then operative to implement the initial rule as noted above for separating intelligible data from image components. The Input Comms 906 also verifies message length and other components and passes the extracted input message to the Message Processor 908. The Message Processor 908 parses the extracted input message, applies the sanitization rules to the parsed extracted input message and generates an extracted output message that is passed to the Output Guard 910. The Output Guard 910 then verifies the extracted output message against release constraints, moves the NITF file to the Downgrader working directory 1006 and passes the extracted output message to the Downgrader 914. The Downgrader 914 moves the NITF file to the Output Comms working directory and passes the NITF extracted output message to the Output Comms 912. Finally, the Output Comms 912 invokes an output script to move the NITF file to an area where it can be accessed by an external addressee system.

FIG. 11 shows an ADS module 1100 with further modifications for image message handling. In this case, again, a script is used to access an NITF file 1102 from an external source system and write the file into the Input Comms working directory 1104. The Input Comms 906, again, is operative to verify the message length and other parameters. However, in this case, the Input Comms does not attempt to parse the input message so as to extract intelligible data. Rather, the Message Processor 908 parses the NITF file into intelligible elements (character and numeric attributes) and nonintelligible elements (file attributes, pointing to segments of original NITF file). The Message Processor 908 then applies the sanitization rules to the parsed NITF file including attributes of all types and generates an output message pointing to an entirely new NITF file 1106 using the attributes. Finally, the Message Processor 908 passes the output message to the Output Guard. The Output Guard 910, in this case, also parses the NITF file into intelligible elements and nonintelligible elements and verifies the parsed NITF file 1106 per release constraints and moves the NITF file 1106 to the Downgrader working directory 1108. The Downgrader 914 moves the NITF file 1106 to the Output Comms working directory 1110 and passes the output message pointing to the NITF file to the Output Comms 912. Finally, the Output Comms 912 invokes a script to move the NITF file to an area 1112 accessible by an external addressee system.

Figure 13:
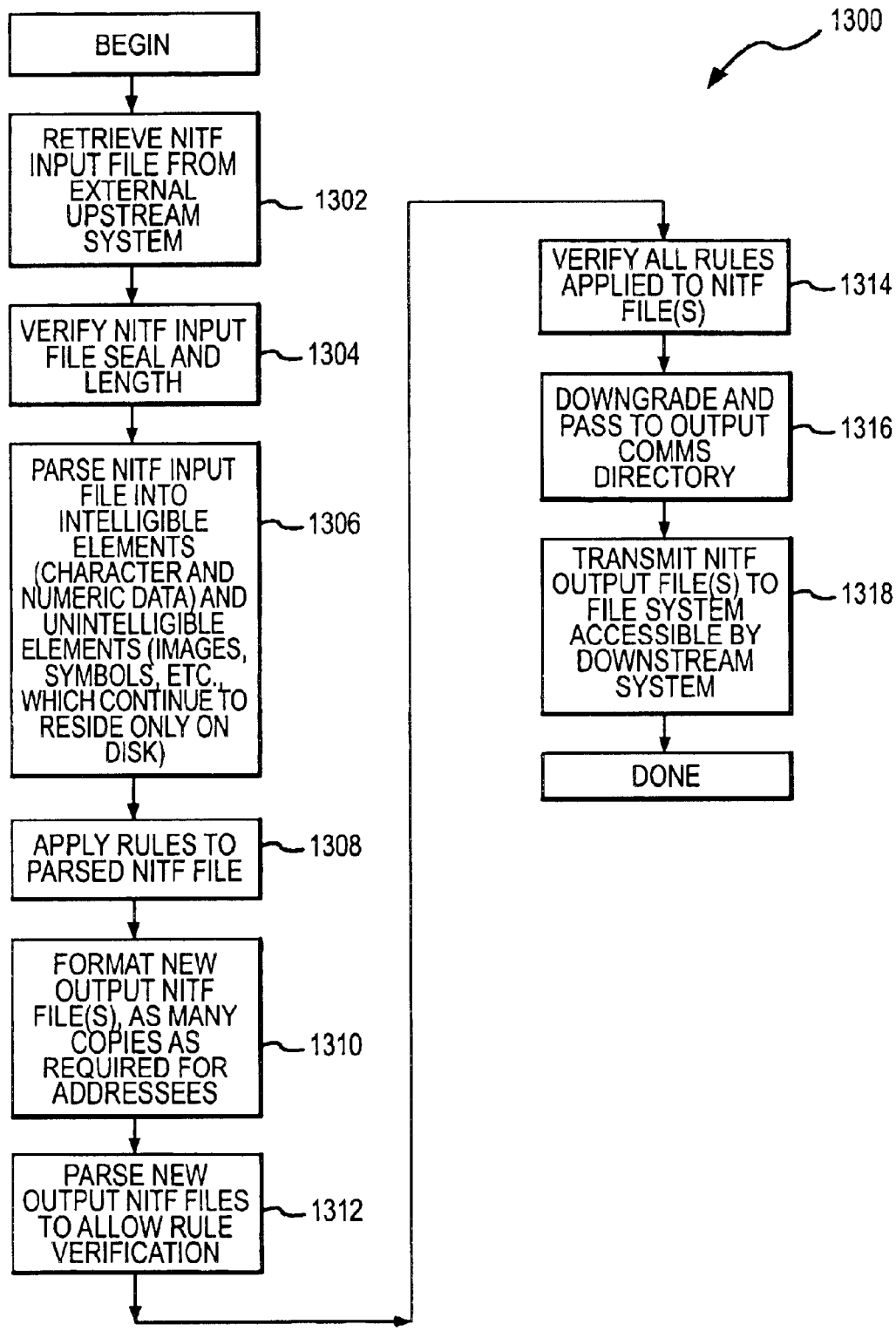
FIG. 13 is a flowchart of an image message process in accordance with the present invention.

FIG. 13 is a flowchart illustrating the sanitization module processing 1300 for handling image messages in accordance with the structure of FIG. 11. The process is initiated by receiving (1302) an NITF input file from an external upstream (source) system. Next, the NITF input file seal and length are verified (1304) and the input file is parsed (1306) into intelligible elements and unintelligible elements. In this regard, the intelligible elements can be moved into running memory while the unintelligible elements including images, symbols, and the like continue to reside only on disk. The module then applies (1308) the appropriate rule to the parsed NITF file and formats (1310) a new NITF file or files including as many copies as required for the addressees. The new output NITF files are then parsed (1312) to allow rule verification and all rules applied to NITF files are verified (1314). The NITF output files are downgraded and passed to the Output Comms directory. Finally, the NITF output files are transmitted (1318) to a file system that is accessible by a downstream (addressee) system.

Figure 12:
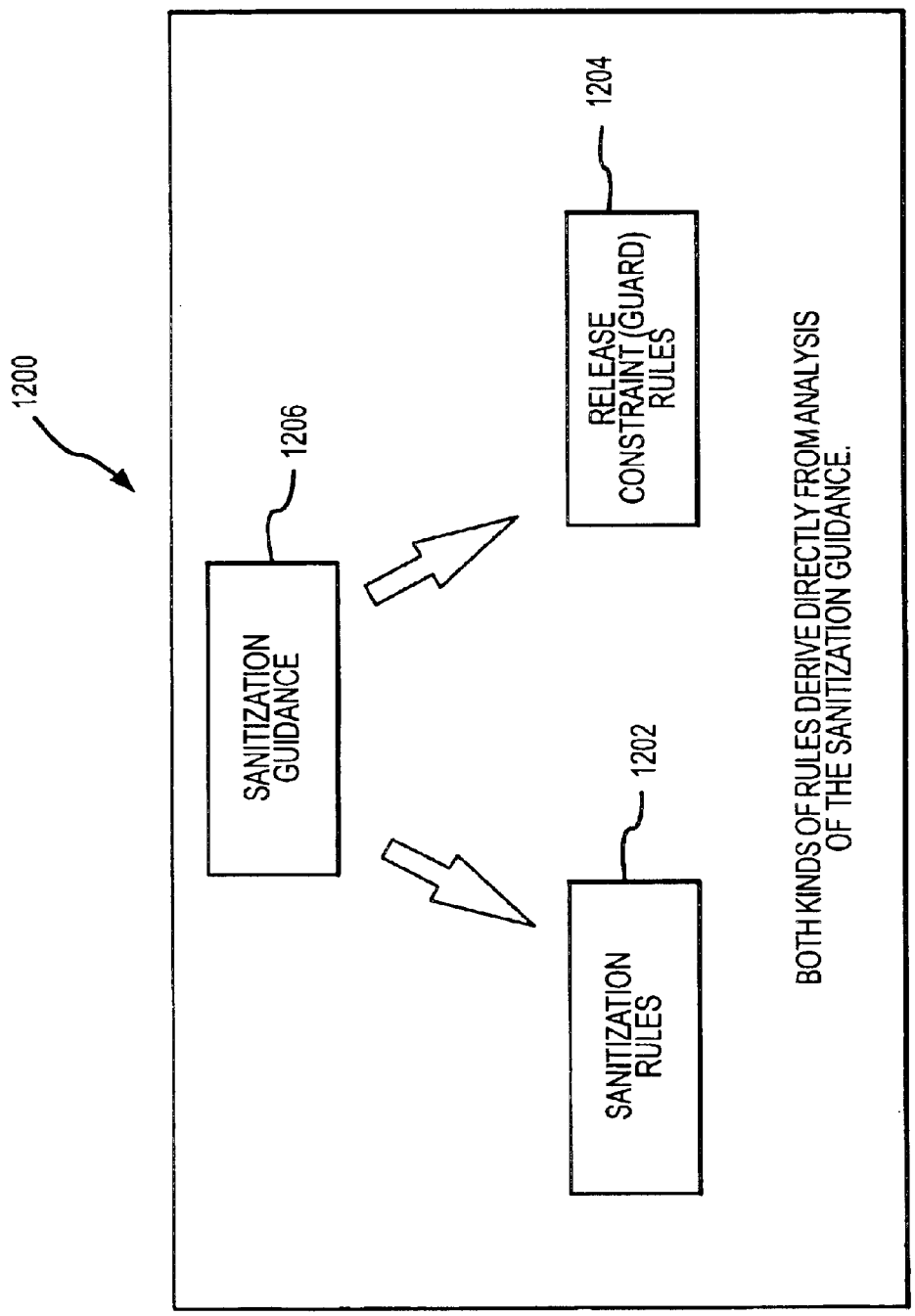
FIG. 12 illustrates the sanitization guidance system in accordance with the present invention.

The foregoing discussion has made reference to two important categories of rules. These rules are illustrated in FIG. 12. The rules 1200 include sanitization rules 1202 and release constraint rules 1204. Together these rules are controlled by sanitization guidance 1206. Each of these types of rules will be discussed in turn below.

When the message processor component of the ADS module obtains a parsed message, the message is generally processed using sanitization tasks common to all messages entering the system over a specific communications network or from a particular source. In this process, the message processor can screen the incoming data either to reduce data throughput to only messages of interest (e.g., data germane to a current area of interest), or perform a change to the data which is pertinent to all addees who will receive this message (e.g., correct the spelling of a particular field value).

The processor can then perform sanitization for specific "addees". An addee refers to an addressee or a group of addressees on a channel which has the same sanitization requirements for messages processed by the ADS module. For example, all Tomahawk ships on the same channel may be grouped under one addee name because each is only authorized to receive secret GENSER level messages. The message processor can then copy the message for each addee. A set of unique sanitization tasks, designed for each particular addee, is used to remove or replace data to satisfy security guidance required to downgrade or process the information for the particular addee. These sanitization tasks, as shown in FIG. 12, are derived directly from security guidance designed for the specific site of employment and the local security concept of operations. This guidance directs how messages processed by that site are to be sanitized for release at specific sensitivity levels.

The entire input message may be screened against a "dirty word" search task containing one or more definable tables of words or phrases or other strings which constitute a security risk. The dirty words may include code words or other classified names and/or locally prescribed dirty words which must be removed in order to properly sanitize the message.

Generally, one or more "rule" sanitization tasks have been developed by the operator to execute specific actions on fields in the message. Rules can add, replace, delete, round, adjust, copy, store or retrieve an attribute value. They can also send a message to the operator for review or delete free text in the message.

These sanitization tasks may be developed locally or imported from another system. The sequence or flow of sanitization tasks is defined by the operator and is generally under two person control, i.e., one person initiates an action and a second person approves the action. Once activated, the sanitization module handles the received messages automatically according to the plan designed by the operator.

The sanitization rules manipulate the parsed data based on a condition statement paired with an action statement; commonly called an if/then statement. If a certain condition exists in a message then the system performs a certain action. Each of these if/then statements is called a rule. Various examples of rules, as well as user interfaces for selecting, defining and implementing them, are set forth in the Parent Application. Some such types of rules include the following.

TABLE 1

| CONDITION | RULE BASED SANITIZATION ACTION |
| --- | --- |
| Operator defined criteria to delete a contact | Delete contact being processed |
| Operator defined criteria to delete a specific attribute | Delete specified attribute |
| Free (unformatted) text in message | Delete free text in message being processed |
| Operator defined value requiring numeric rounding | Round the value of the attribute as specified |
| Operator designates attribute whose value is to be replaced and designated attribute exists in the message | Replace the value of the attribute with the supplied value |

TABLE 1-continued

| CONDITION | RULE BASED SANITIZATION ACTION |
|---|---|
| Operator designates attribute whose value is to be replaced but designated attribute does not exist in the message | Add a new attribute containing the supplied value |
| Operator defined condition when met requires additional actions to be performed | Apply the additional rules to the contact meeting the conditions |
| Operator designates attribute whose value is to be copied to another attribute | Copy the value of the attribute to value of the designated attribute |
| Operator designates attribute whose value is to be adjusted | Adjust the value of the attribute as specified |
| Operator designates attribute whose value is incremented based on a previously applied value | Increment the value of the designated attribute |
| Operator designates an attribute whose value is to be stored | Store the value of a designated attribute based on a key attribute which uniquely identifies the stored attribute |
| Operator designates key attribute which identifies the stored attribute list from which the attribute value is to be retrieved | Retrieve the value of a designated attribute based on a key attribute which uniquely identifies the stored attribute list from which the attribute is to be retrieved |

Figure 14:
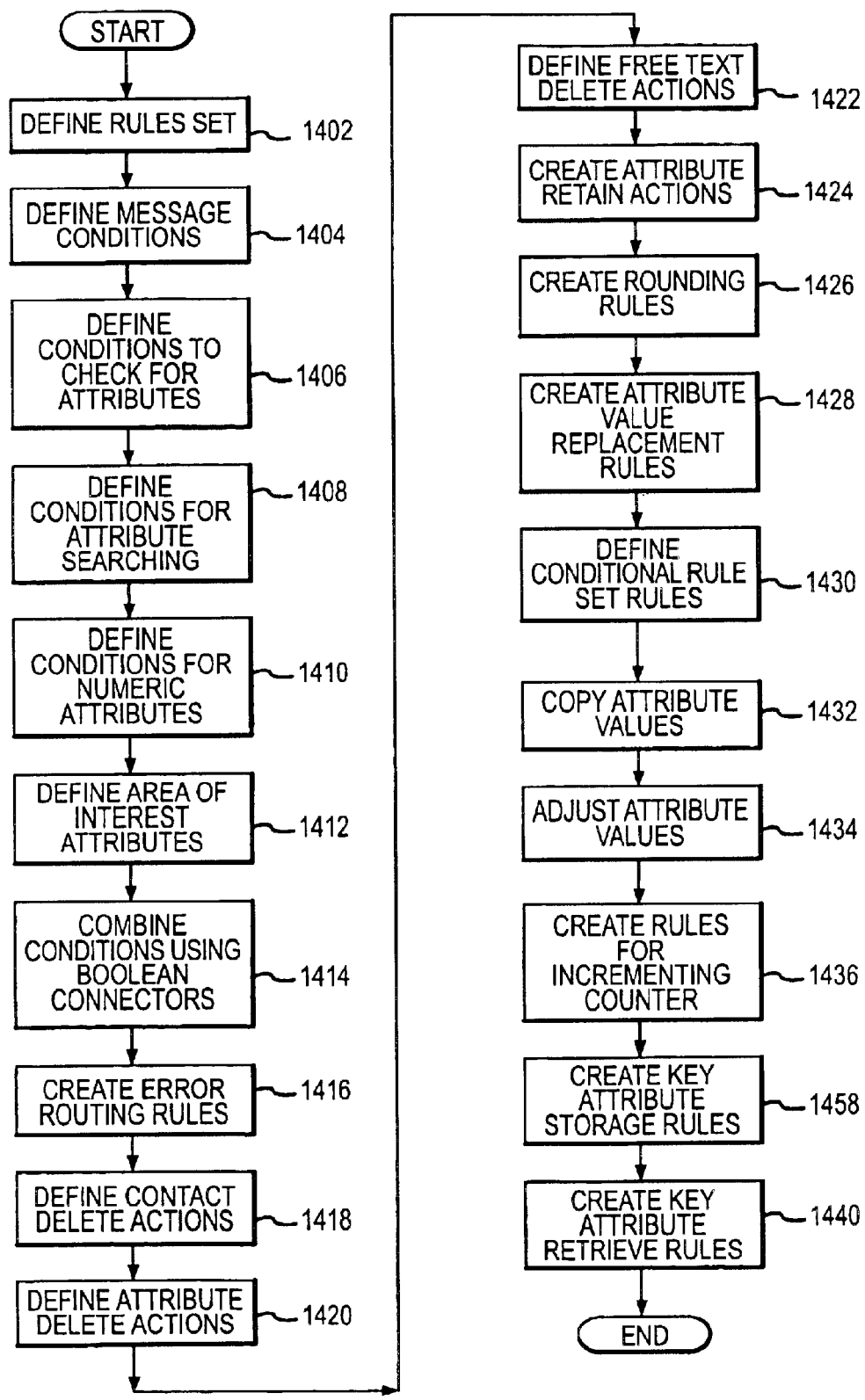
FIG. 14 is a flowchart illustrating a process for development of rules for rule based sanitization.

FIG. 14 is a flowchart showing the steps an operator may perform in the development of rules based sanitation. The associated steps are listed below:

1. Define (1402) a set of rules used to sanitize messages and their component contacts.
2. Define (1404) conditions on message-level attributes and attributes of contacts contained in the message.
3. Define (1406) conditions checking for the existence of attributes.
4. Define (1408) conditions for text or character attributes searching for the occurrence of a given string, which may include wildcards (symbols that represent any characters)
5. Define (1410) conditions for numeric attributes as a comparison to a given value using the relational operators (equal, less than, greater than) or their negations
6. Define (1412) conditions in which contact positions are within a specified Area of Interest (predefined geographic area, e.g., in terms of coordinates).
7. Combine (1414) conditions in a set using boolean logical connectors.
8. Create (1416) rule actions to route messages being processed to the Error Queue.
9. Define (1418) contact deletion actions.
10. Define (1420) attribute deletion actions, specifying the attribute to delete.
11. Define (1422) actions to delete all attributes containing free text.
12. Create (1424) rule actions which designate attributes to be retained, deleting all attributes not listed.
13. Create (1426) rule actions that specify the precision to which a specified numeric attribute (integer, floating point number, position, or time) is to be rounded.
14. Create (1428) rule actions which replace attribute values with supplied values.
15. Define (1430) rule actions which provide an additional set of rules to be conditionally performed.
16. Copy (1432) one attribute value to that of another attribute.
17. Adjust (1434) an attribute value by a supplied amount.
18. Create (1436) rule actions which increment the value of an attribute by a specified amount based on a previously defined message counter definition.
19. Create (1438) rule actions which store the value of an attribute based on the presence of an associated key attribute.
20. Create (1440) rule actions which retrieve a stored attribute value based on the presence of an associated key attribute.

In addition to rules based sanitization, the ADS module determines the classification level of the received message by reading the sensitivity labels in the message. The input and output communications channels parameters are defined by the operator according to local site security requirements, e.g., from top secret/sensitive compartmented information (TS/SCI) to top secret/NATO releaseable (TS/NATO), or from TS/SCI to secret (S). Using these definitions, the ADS module initiates internal checks and verification processes to insure data is guarded against release to unauthorized channels and addressees. Once sanitized, the message is reformatted.

The ADS module as discussed above also contains a separate Guard. The Guard contains rules, called release constraint rules (RCRs). The RCRs are defined by the operator under two person control and, again, as depicted in FIG. 12, in accordance with the same sanitization guidance which governed the development of the sanitization rules. RCRs are designed to verify that each message has been properly sanitized by the sanitization rules. The Guard also verifies that correct classification markings are present and that the message header and body format are correct. It verifies that the correct constraints on message release are in place and that the message is at the right classification level to be released to the channel and addees prior to passing the message to the output channel for transmission.

The foregoing description has included a discussion of the various MAG and ADS components and processes. Further details in this regard, as well as user guide level instructions for operation of a specific product implementation provided in the Parent Application.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A method for use in transforming content between an internal form associated with an internal system and an external form for use by an external system, said method comprising the steps of:

establishing a generic processing engine for performing a transformation process relative to an information stream associated with an external system, said generic processing engine being adaptable to handle content in multiple forms associated with multiple external systems;

first operating said generic processing engine to receive first content in one of said internal and external forms;

second operating said generic processing engine to access storage including at least first external specification information relating to a first form of a first external system and second external specification information relating to a second form of a second external source;

configuring said generic processing engine based on a selected one of said first and second external specifications information; and third operating said generic processing engine as configured using said selected one of said first and second external specification information to transform said message between said internal form and said external form.

2. A method as set forth in claim 1, wherein said step of receiving comprises obtaining said first content in said internal form of said internal system and said step of third operating comprises transforming said message into said external form associated with said internal system.

3. A method as set forth in claim 1, wherein said step of receiving comprises obtaining said first content in said external form of said external system and said step of third operating comprises transforming said message into said internal form of said internal system.

4. A method as set forth in claim 1, wherein said step of second operating comprises compiling said generic processing engine and, subsequent to said step of compiling, accessing said storage.

5. A method as set forth in claim 1, wherein said first external specification information is stored in one or more tables and said step of second operating comprises accessing said tables.

6. A method as set forth in claim 5, wherein each of said one or more tables includes parameter information for use in defining said first external specification and identification information for associating said parameter information with said first external specification and said step of second operating comprises using said identification information to access said one or more tables.

7. A method as set forth in claim 1, wherein said step of configuring comprises using parameter information defining said first external specification to define a transformation function of said generic processing engine.

8. A method as set forth in claim 1, wherein said step of second operating comprises compiling said generic processing engine to provide a compiled processing engine and said step of configuring comprises operating said compiled processing engine to use said first external specification to define a first transformation function of said compiled processing engine, and said method further comprises operating said compiled processing engine to use said second external specification to define a second transformation function of said compiled processing engine, whereby said generic processing engine is reconfigured free from any intervening step of recompiling.

9. A method as set forth in claim 1, wherein said step of third operating comprises iteratively dividing said message into multiple portions, transforming selected ones of said portions between said internal and external forms, and further dividing other ones of said portions.

10. A method for use in transforming content between an internal form associated with an internal system and a form for use by an external system, said method comprising the steps of:

A) establishing a processing module for processing a data stream, said processing module including a parsing engine and a processing engine;

B) operating said parsing engine to select a portion from said data stream and define said portion as a parent object;

C) operating said parsing engine to parse said parent object into multiple child objects wherein each of said child objects has a child content that is a subset of a parent content of said parent;

D) operating said processing engine to identify any one of said multiple child objects having a desired processing resolution and, with respect to any such identified child object, perform a predefined process related to transforming said message between said first and second forms;

E) redefining at least one of said multiple child objects as a parent object, said second one of said multiple child objects being the same as or different from said first one of said multiple objects; and F) repeating said steps C and D with respect to said redefined object;

wherein said processing module is operative for recursively processing said information stream.

11. A method as set forth in claim 10, wherein said step D involves performing said predefined process on a first one of said multiple objects and said step E involves redefining a second one of said multiple objects different than said first one.

12. A method as set forth in claim 10, wherein said predefined process involves converting said identified object from a first format of said internal system to a second format of said external system.

13. A method as set forth in claim 10, wherein said predefined process involves performing a security screen on said identified child object.

14. A method as set forth in claim 10, further comprising iteratively repeating said steps C, D and E until said predefined process has been performed on a desired portion of said data stream.

15. A method for use in transliterating content from one input format into multiple output formats, comprising the steps of:

accessing first content reflecting a first input format;

making at least one copy of said first content;

accessing a first external format specification relating to a first one of the multiple output formats;

configuring a processing engine based on the first external format specification;

first operating said processing engine to access a first instance of said first content and transform said first content based on said first external format specification to provide a first transformed content;

accessing a second external format specification relating to a second one of said multiple output formats;

configuring said processing engine based on said second external format specification;

second operating said processing engine to access a second instance of said first content and transform said first content based on said second specification to provide a second transformed content; and transmitting said first and second transformed content.

16. A method as set forth in claim 15, wherein said first external format specification is stored in one or more first tables and said second external format specification is stored in one or more second tables, and said processing engine is operative for successively accessing said first tables and second tables free from any intervening step of recompiling.

17. An apparatus for use in transforming a content between an internal form associated with an internal system and an external form for use by an external system, comprising:

storage structure for storing at least first external specification information relating to a first external form of a first external system and second external specification information relating to a second external form of a second external system;

a processor operative for compiling a generic processing engine for:

performing a transformation process relative to an information stream associated with an external system, said generic processing engine being adaptable to handle information in multiple forms associated with multiple external systems;

accessing said storage structure to obtain said first external specification information;

configuring said compiled generic processing engine based on said first external specification information; and operating said generic processing engine as configured using said external specification information to transform said content between said first internal form and said first external form.

18. An apparatus as set forth in claim 17, wherein said processor is operative for obtaining said content in said internal form of said internal system and transforming said content into said first external form of said first external system.

19. An apparatus as set forth in claim 17, wherein said processor is operative for obtaining said content in said first external form of said first external system and transforming said content into said internal form of said internal system.

* * * * *